United States Patent
Dagnino et al.

(10) Patent No.: US 10,002,701 B2
(45) Date of Patent: Jun. 19, 2018

(54) PROFILING TRANSFORMER OF POWER SYSTEM

(71) Applicants: Aldo Dagnino, Cary, NC (US); Luiz V. Cheim, St. Charles, MO (US); Lan Lin, Raleigh, NC (US); Poorvi Patel, Ballwin, MO (US)

(72) Inventors: Aldo Dagnino, Cary, NC (US); Luiz V. Cheim, St. Charles, MO (US); Lan Lin, Raleigh, NC (US); Poorvi Patel, Ballwin, MO (US)

(73) Assignee: ABB Schweiz AG, Baden (CH)

( * ) Notice: Subject to any disclaimer, the term of this patent is extended or adjusted under 35 U.S.C. 154(b) by 346 days.

(21) Appl. No.: 14/443,816

(22) PCT Filed: Nov. 19, 2013

(86) PCT No.: PCT/US2013/070696
§ 371 (c)(1),
(2) Date: May 19, 2015

(87) PCT Pub. No.: WO2014/078830
PCT Pub. Date: May 22, 2014

(65) Prior Publication Data
US 2016/0005522 A1 Jan. 7, 2016

Related U.S. Application Data

(60) Provisional application No. 61/727,890, filed on Nov. 19, 2012.

(51) Int. Cl.
*G06F 15/18* (2006.01)
*H01F 27/12* (2006.01)
(Continued)

(52) U.S. Cl.
CPC .......... *H01F 27/12* (2013.01); *G05B 13/027* (2013.01); *H01F 2027/406* (2013.01)

(58) Field of Classification Search
USPC .......................................................... 706/12
See application file for complete search history.

(56) References Cited

U.S. PATENT DOCUMENTS

| 7,099,231 B2 * | 8/2006 | Au | ........................... G11C 7/08 365/189.02 |
| 7,534,764 B2 * | 5/2009 | Ganz | .................. A61K 38/1709 514/1.1 |

(Continued)

FOREIGN PATENT DOCUMENTS

CN 102313838 A 1/2012

OTHER PUBLICATIONS

Prediction of top-oil temperature for transformers using neural networks Q. He; J. Si; D. J. Tylavsky IEEE Transactions on Power Delivery Year: 2000, vol. 15, Issue: 4 pp. 1205-1211 IEEE Journals & Magazines.*

(Continued)

*Primary Examiner* — Michael B Holmes
(74) *Attorney, Agent, or Firm* — J. Bruce Schelkopf; Taft Stettinius & Hollister LLP

(57) ABSTRACT

Method and system for predicting an oil temperature of a transformer for a desired load and/or predicting a load that a transformer can support for a desired time. A machine learning algorithm is developed using historical data of a transformer. After the algorithm is developed, historical data corresponding to the transformer are input into the algorithm to develop a profile of the transformer describing how the temperature of oil within the transformer is expected to change as a function of a desired load. Using the profile, the of temperature of the transformer is predicted for a desired load. In this way, a prediction is made as to whether and/or (Continued)

for how long a transformer may support a desired load before the oil temperature reaches a specified threshold and/or before the transformer fails due to the load.

20 Claims, 6 Drawing Sheets

(51) Int. Cl.
*G05B 13/02* (2006.01)
*H01F 27/40* (2006.01)

(56) References Cited

U.S. PATENT DOCUMENTS

| | | | | |
|---|---|---|---|---|
| 7,745,407 B2* | 6/2010 | Ganz | ............ | A61K 38/1709 435/6.11 |
| 7,877,196 B2* | 1/2011 | Lin | ............ | G08G 1/0104 701/117 |
| 8,067,694 B2* | 11/2011 | Patel | ............ | H01B 9/027 174/126.1 |
| 8,707,095 B2* | 4/2014 | Grimshaw | ............ | G06F 11/2015 714/14 |

OTHER PUBLICATIONS

Online monitoring of temperature in power transformers using optimal linear combination of ANNs M. K. Pradhan; T. S. Ramu Conference Record of the 2004 IEEE International Symposium on Electrical Insulation Year: 2004 pp. 70-73 IEEE Conference Publications.*

Transformer oil lifetime prediction using the Arrhenius law based on physical and electrical characteristics F. Husnayain; M. Latif; I. Garniwa 2015 International Conference on Quality in Research (QiR) Year: 2015 pp. 115-120 IEEE Conferences.*

Simulation and analysis of oil-immersed transformer based on thermal-fluid coupled field Qiao Wen; Zhang Baohui; Hao Zhiguo; Bo Zhiclian 2014 International Conference on Power System Technology Year: 2014 pp. 826-831 IEEE Conferences.*

Optimal utilization of power transformers through virtual sensing Jagabondhu Hazra; K. Das; Ashok Pon Kumar; B. Narayanaswamy; Deva P. Seetharam; Nis Jespersen IEEE PES ISGT Europe 2013 Year: 2013 pp. 1-5 IEEE Conferences.*

Thermal Modeling of an Inverted-Type Oil-Immersed Current Transformer Satish M. Mahajan; Diego M. Robalino; Vinod Sivan IEEE Transactions on Power Delivery Year: 2010, vol. 25, Issue: 4 pp. 2511-2518 IEEE Journals & Magazines.*

First Chinese Office Action cited in Chinese Application No. 2013800707660 dated Oct. 9, 2016, 8 pgs.

"Neural Network for Transformer Top-oil Temperature Prediction", R. Vilaithong, S. Tenbohlen and T. Stirl, Aug. 2007, XV International Symposium on High Voltage Engineering, University of Ljubjana, 6 pgs.

Second Chinese Office Action cited in Chinese Application No. 2013800707660 dated Jun. 6, 2017, 10 pgs.

International Search Report cited in related application No. PCT/US13/70696 dated Jun. 30, 2014, pp. 15.

Qing He et al: Prediction of Top-Oil Temperature for Transformers Using Neural Networks II , IEEE Transactions on Power Delivery, IEEE Service Center, New York, NY, US, va 1. 15, No. 4, Oct. 1, 2000 (Oct. 1, 2000), XP011049941, ISSN: 0885-8977, pp. 1-8.

* cited by examiner

PROFILING TRANSFORMER OF POWER SYSTEM

RELATED APPLICATION

This application claims priority to U.S. Provisional Patent Application No. 61/727,890, filed on Nov. 19, 2012 and entitled "PROFILING TRANSFORMER OF POWER SYSTEM".

BACKGROUND

The present application relates to the field of power systems and more particularly to systems and/or techniques for predicting how a transformer of a power system may respond when a desired load is applied to the transformer.

A power system comprises a network of electrical components or power system equipment configured to supply, transmit, and/or use electrical power. For example, a power grid (e.g., also referred to as an electrical distribution grid) comprises generators, transmission systems, and/or distribution systems. Generators, or power stations, are configured to produce electricity from combustible fuels (e.g., coal, natural gas, etc.) and/or non-combustible fuels (e.g., such as wind, solar, nuclear, etc.). Transmission systems are configured to carry or transmit the electricity from the generators to loads. Distribution systems are configured to feed the supplied electricity to nearby homes, commercial businesses, and/or other establishments. Among other electrical components, such power systems may comprise one or more transformers configured to convert or transform electricity at one voltage (e.g. a voltage used to transmit electricity) to electricity at another voltage (e.g., a voltage desired by a load receiving the electricity). Depending upon the scale of the power system and/or the load applied to the transformer, the cost to purchase transformers can range from a few thousand dollars to over one million dollars.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

According to one aspect, a method for a power system is provided. The method comprises predicting an oil temperature of a transformer of the power system for a desired load based upon a profile of the transformer developed via a machine-learning algorithm.

According to another aspect, a method for a power system is provided. The method comprises identifying a failure of a first transformer of the power system, the first transformer supporting a first load. The method also comprises identifying a second transformer of the power system that can support at least some of the first load for a desired time. Identifying the second transformer comprises estimating a load that the second transformer can support for the desired time based upon a profile of the second transformer. The method also comprises transferring to the second transformer at least some of the first load, a total load of the second transformer not exceeding the estimated load.

According to yet another aspect, a system for a power system is provided. The system comprises a profile generation component configured to develop a profile of a transformer of the power system using a neural network algorithm. The neural network algorithm receives, as an input, historical data corresponding to the transformer. The system also comprises a prediction component configured to predict an oil temperature of the transformer at a desired load based upon the profile of the transformer To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
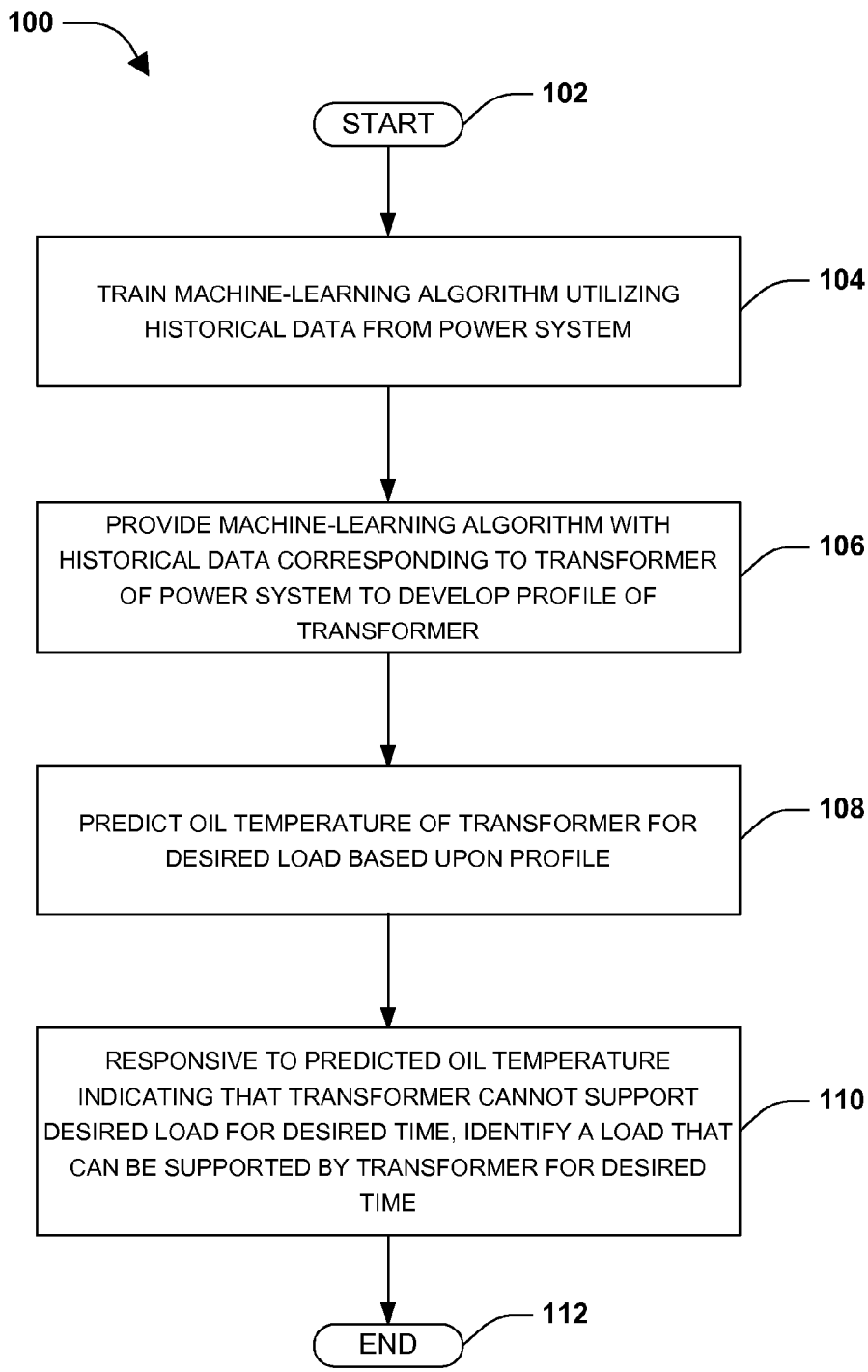
FIG. 1 is a flow diagram illustrating an exemplary method for a power system.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

A power grid or power system frequently comprises of one or more transformers configured to convert or transform electricity at one voltage (e.g. a voltage used to transmit electricity) to electricity at another voltage (e.g., a voltage desired by a load receiving the electricity). At times, it is desirable to shift at least some of a load from a first transformer to a second transformer of the power system. For example, the first transformer may fail and/or may be at least partially de-energized for maintenance and/or testing (e.g., taking the first transformer off-line). In order to maintain the performance of the power system while the first transformer is off-line, it may be desirable to shift the load of the first transformer to one or more other transformers. However, shifting the load to a transformer(s) (e.g., and potentially overloading the transformer(s)) may increase the risk that the transformer(s) will fail (e.g., further reducing performance of the power system).

Accordingly, systems and/or techniques are provided for determining a load that a transformer is capable of supporting (e.g., without failing and/or without an oil temperature of the transformer reaching a specified threshold). More particularly, systems and/or techniques are provided for predicting an oil temperature of a transformer if a desired load is applied to the transformer and/or predicting how long a transformer can support the desired load. Oil temperature typically corresponds to (e.g., is directly related to) the failure of a transformer. When the oil temperature of the transformer reaches a particular level, the transformer typically fails and/or is at a high risk of failure. Thus by predicting the oil temperature of the transformer, it may be determined whether the transformer is capable of supporting a desired load. Moreover, it may be determined how long the transformer may support the desired load without the oil temperature reaching a specified value (e.g., approximate a value where the transformer may fail), for example.

One embodiment for predicting an oil temperature of a transformer (e.g., to determine if the transformer can support a desired load) is illustrated by example method 100 in FIG. 1. The example method 100 starts at 102, and a machine-learning algorithm is trained utilizing historical data from a power system at 104. That is, stated differently, an algorithm is designed or developed that attempts to identify patterns or trends in the historical data of the power system. In this way, when provided with data corresponding to a particular transformer, a profile may be developed indicative of how the transformer is expected to respond in various situations.

The phrase historical data is used herein to describe data that has been collected over a period of time. As such, the historical data may reflect changes that have occurred in the power system or components thereof over time. For example, the historical data may describe how a characteristic(s) of a transformer (e.g., such as oil temperature) changes with variations in an operating condition(s) of the transformer (e.g., such as applied load, ambient air temperature proximate the transformer, etc.).

Although a power system may comprise a plurality of different types of electrical components, such as circuit breakers, transformers, generators, etc., the historical data may relate to merely a subset of the electrical components of a power system. As an example, in one embodiment, the historical data may merely pertain to transformers of the power system and/or merely pertain to a particular class of transformer (e.g., configured to convert voltage between a first voltage or first voltage range and a second voltage or second voltage range). In another embodiment, the historical data utilized to train the machine-learning algorithm may relate to (e.g., be derived from) a plurality of different sources or different types of electrical components of the power system, for example.

The historical data may comprise, among other things, historical sensor data derived from one or more sensors operably coupled to electrical components represented in the historical data and/or historical field test data derived from one or more field tests performed on the electrical components. As an example, sensors embedded within transformers of the power system may periodically or intermittently measure one or more properties of respective transformers to provide a snapshot of the performance/health of respective transformers at the instant the measurement is acquired. Over time, a plurality of snapshots may be acquired to yield the historical sensor data.

Historical field test data may be representative of a plurality of field tests performed over some length of time. Such field test may measure the same properties as the sensor(s) and/or may measure one or more properties that are not measured by the sensors. By way of example, the sensors may be configured to measure fewer than six dissolved gases (e.g., in the oil of the transformer) and a field test may be configured to measure ten or more dissolved gases (e.g., which may overlap with the dissolved gases measured by the sensors or may be non-overlapping). Thus, the field test may measure the same or different properties/characteristics of the electrical component(s) relative to the sensors.

Another difference between historical sensor data and historical field test data may relate to how/when the measurements from which the data is derived occur. For example, sensor measurements may occur while the transformer or other electrical component is operating whereas field test measurements may be performed while the transformer or other electrical component is not operating or de-energized (e.g., or samples from which field test measurements are taken may be acquired while the transformer or other electrical component is de-energized).

The properties measured by the sensors and represented in the historical sensor data may be a function of, among other things, a type of power system equipment to which the sensors are operably coupled. Similarly, the properties measured by the field test data and represented in the historical field test data may be a function of, among other things, a type of power system equipment at which the field test are performed. For example, in a transformer, dissolved gas concentrations, oil temperature, water-to-oil ratio, core temperature, and/or ambient air temperature proximate the transformer may be measured via the sensors and/or via field test. Field tests performed on and/or sensor measurement acquired from a circuit breaker, capacitor, voltage regulator, or other electrical component of the power system, may be indicative of other or different properties, for example.

In another embodiment, the historical data from the power system may also and/or instead comprise heat run test data derived from a heat run test performed one or more transformers of a power system. Such a test is typically performed on respective transformers prior to being put into service (e.g., deployed to the field) to develop a signature for the particular transformer being tested. A heat run test typically verifies a power/voltage rating of the transformer, determine a maximum temperature of a winding(s) under normal operating conditions, and/or verify a maximum temperature of oil in the transformer under normal operating conditions, for example. Measurements acquired from the heat run test may also pertain to, among other things, winding temperatures, longitudinal temperature gradients, cooper-oil temperature gradients, etc., for example.

The machine learning algorithm that is designed and/or developed using the historical data from the power system may be any one of numerous types of machine-learning algorithms. For example, in one embodiment, the machine learning algorithm is a neural network algorithm, such as a feed-forward artificial neural network algorithm comprising one or more hidden layers. In a preferred embodiment, the neural network algorithm comprises two hidden layers; although in other embodiments the neural network algorithm may comprise more than two hidden layers or fewer than two hidden layers. In still other embodiments, the machine-learning algorithm may utilize a decision tree learning approach, an association rule learning approach, and/or other approaches to develop or train the algorithm instead of or in conjunction with an artificial neural network approach.

At 106 in the example method 100, the machine-learning algorithm is provided with historical data corresponding to a transformer of the power system to develop a profile of the transformer. It may be appreciated that while the historical data corresponding to the transformer may have been part of the historical data of the power system utilized to train the machine-learning algorithm, the machine-learning algorithm is typically trained utilizing at least some data not corresponding to the transformer (e.g., and instead corresponding to another one or more transformers). Thus, the data utilized to train the machine-learning algorithm may not be identical to the data from which the profile of the transformer is developed via the machine-learning algorithm. In another embodiment, the historical data corresponding to the transformer may have been excluded from the historical data of the power system utilized to train the algorithm and/or merely a portion of the historical data utilized to develop the profile may have also been utilized to train the algorithm.

The profile typically describes how the transformer is expected to perform under various operating conditions. More particularly, the profile may describe how a temperature of oil within the transformer is expected to change as a function of changes to one or more operating conditions of the transformer (e.g., or as a function of the inter-relationship between various operating conditions) and/or what the temperature of the oil is expected to be when a desired load is applied to the transformer. For example, oil of the transformer may have a first temperature when a first load is applied to the transformer and when the air proximate the transformer measures a first ambient air temperature. When the load applied to the transformer changes and/or the ambient air temperature changes, the oil in the transformer may change as a function of the changed load and/or changed ambient air temperature. It may be appreciated that other operating conditions that may be taken into account by the profile include, among other things, dissolve gas concentrations, core temperature, a winding time constant, oil time constant, and/or volume of oil, for example.

The historical data that is provided to the machine-learning algorithm at 106 may comprise data of a similar type(s) to the historical data utilized to train the machine-learning algorithm and/or may be of a different type. For example, the historical data provided to the machine-learning algorithm at 106 may comprise sensor data, field test data, and/or heat run test data.

By way of example and not limitation, in one embodiment, variables to the machine-learning algorithm may comprise ambient air temperature and load of the transformer. Constants for the machine-learning algorithm, specific to the transformer, may comprise winding time constant, oil time constant, and/or volume of oil. In such an example, information regarding the ambient air temperature and/or load of the transformer at various times may be provided via historical sensor data. Information regarding winding time constant, oil time constant, and/or volume of oil may be provided via heat run test data. Thus, using the historical sensor data and heat run test data, the machine-learning algorithm may develop a profile of the transformer describing how the transformer is expected to operate at an ambient air temperature and a desired load, for example. In another embodiment, the ambient air temperature and/or load of the transformer may be derived from historical field test data and/or other data. Further, it may be appreciated that the foregoing variables and/or foregoing constants are merely provided as an example and an algorithm may be devised that utilizes other characteristics to develop the profile.

At 108 in the example method 100, an oil temperature of the transformer is predicted for a desired load based upon the profile of the transformer developed at 106 in the example method 100. That is, stated differently, the profile is utilized to determine what the oil temperature of the transformer is expected to be for a given/desired load and/or how the temperature of the oil might behave (e.g., increase or decrease) as a function of how a load of the transformer changes.

The probability or likelihood of a transformer failing may correlate to the oil temperature of a transformer. That is, as the oil temperature approaches a threshold value, the transformer may become unstable and/or may be no longer able to support the load. When the oil temperature reaches and/or exceeds the threshold value, the transformer may fail and/or the probability of the transformer failing may be above a specified tolerance. As such, by predicting the oil temperature of the transformer at a desired load, it may be predicted whether the transformer can support (e.g., is capable of supporting) the load without failing and/or without the oil temperature exceeding a specified threshold. If the oil temperature exceeds the specified threshold (e.g., or a margin set below the threshold to provide a safety margin), it may be undesirable to increase the load of the transformer to the desired load because the risk of failure (e.g., and potential to destroy the transformer) is too great, for example.

It may be appreciated that the ability of a transformer to support a load may be a function of a length of time that the transformer is expected to support the load. For example, a transformer that is overloaded for a short period of time may be able to support the load (e.g., because the oil temperature may increase gradually). However, if the transformer is overloaded for a longer period of time, the transformer may fail. As such, it one embodiment, the prediction at 106 does not merely comprise a single oil temperature value for a desired load, but rather describes/predicts how the oil temperature is expected to change over a period of time if the desired load continues to be applied to the transformer. In another embodiment, the oil temperature predicted at 108 may be a maximum expected temperature of the oil for the desired load, for example.

It may also be appreciated that the ability of the transformer to support the load may be a function of present operating conditions. For example, the ability of the transformer to support the load may be a function of the present oil temperature of the transformer. If the present oil temperature is high, it may take less time to reach the threshold temperature than if the present oil temperature is lower. Further, the ambient air temperature may have an effect on the oil temperature. For example, a transformer may be able to support a larger load when the ambient air temperature is lower because the lower ambient air temperature may cool the oil. As another example, a rate at which the oil temperature increases as a load of the transformer increases may be less when the ambient air temperature is lower, again because at least some heat from the transformer may be transferred to the ambient air.

Accordingly, in one embodiment, predicting the oil temperature for a desired load may be based upon present operating conditions of the transformer. Such present operating conditions may comprise, among other things, a present load of the transformer, a present ambient air temperature proximate the transformer, present dissolved gas concentrations, a present core temperature, and/or a present oil temperature, for example. Moreover, the present operating conditions may be derived from, among other things, sensor data and/or field test data yielded from sensor measurements and/or field test measurements performed more recently than the historical data corresponding to the transformer. To this end, it may be appreciated that present operating conditions may not necessarily reflect real-time, instantaneous information regarding the transformer, but may instead reflect measurements acquired days, weeks, or months ago (e.g., but which are more current than the historic data corresponding to the transformer).

In one embodiment, predicting the oil temperature at 106 may further comprise predicting a time (e.g., a length of time) that the transformer can support the desired load and/or predicting when the transformer can no longer support the desired load. That is, as previously described, a change to the load on a transformer may not have an immediate effect on the oil temperature. Rather, a change in the load may cause the oil temperature to change over time until the oil temperature reaches a maximum oil temperature (e.g., for the given load and/or given ambient air temperature, for example). Thus, a transformer that is capable of supporting a desired load for 20 minutes may not be capable of supporting the desired load for 30 minutes because the oil temperature of the transformer may climb above a specified threshold (e.g., a predefined temperature) between the 20 minute mark and the 30 minute mark. Accordingly, a prediction may be made regarding how long the transformer can support the desired load (e.g., given presenting operating conditions of the transformer), for example.

At 110 in the example method 100, a load that can be supported by the transformer for a desired time (e.g., length of time) may be identified responsive to the predicted oil temperature (e.g., prediction at 108) indicating that the transformer cannot support the desired load for the desired time. That is, stated differently, when it is determined that the desired load cannot be supported for a desired length of time, it may be determined what load can be supported for the desired length of time (e.g., given present operating conditions of the transformer).

In one embodiment, calculating a load that may be supported for a desired time may be an iterative process, whereby an oil temperature is predicted for a plurality of loads until a load is identified that can be supported for the desired length of time. In another embodiment, a non-iterative approach may be utilized to estimate/identify a load that may be supported for the desired time.

The example method 100 and/or portions of the example method 100 may find particular applicability with respect to the maintenance and/or replacement of transformers. By way of example, when a transformer fails, goes offline, and/or is operated at a reduced capacity (e.g., for maintenance and/or routine replacement), it may be desirable to transfer the load of the transformer to one or more other transformers with excess capacity to mitigate performance degradations of the power system. As such, it may be useful to determine whether one or more transformers have the excess capacity to support the added load while the transformer is maintained or replaced. The example method 100 describes a technique for determining whether a transformer(s) can support a desired load (e.g., the transformer's normal load plus the added load) based upon the predicted oil temperature of the transformer at the desired load and/or whether a transformer(s) can support the load for a desired length of time necessary to maintain and/or replace the transformer from which the load is transferred, for example.

At 112, the example method 100 ends.

Figure 2:
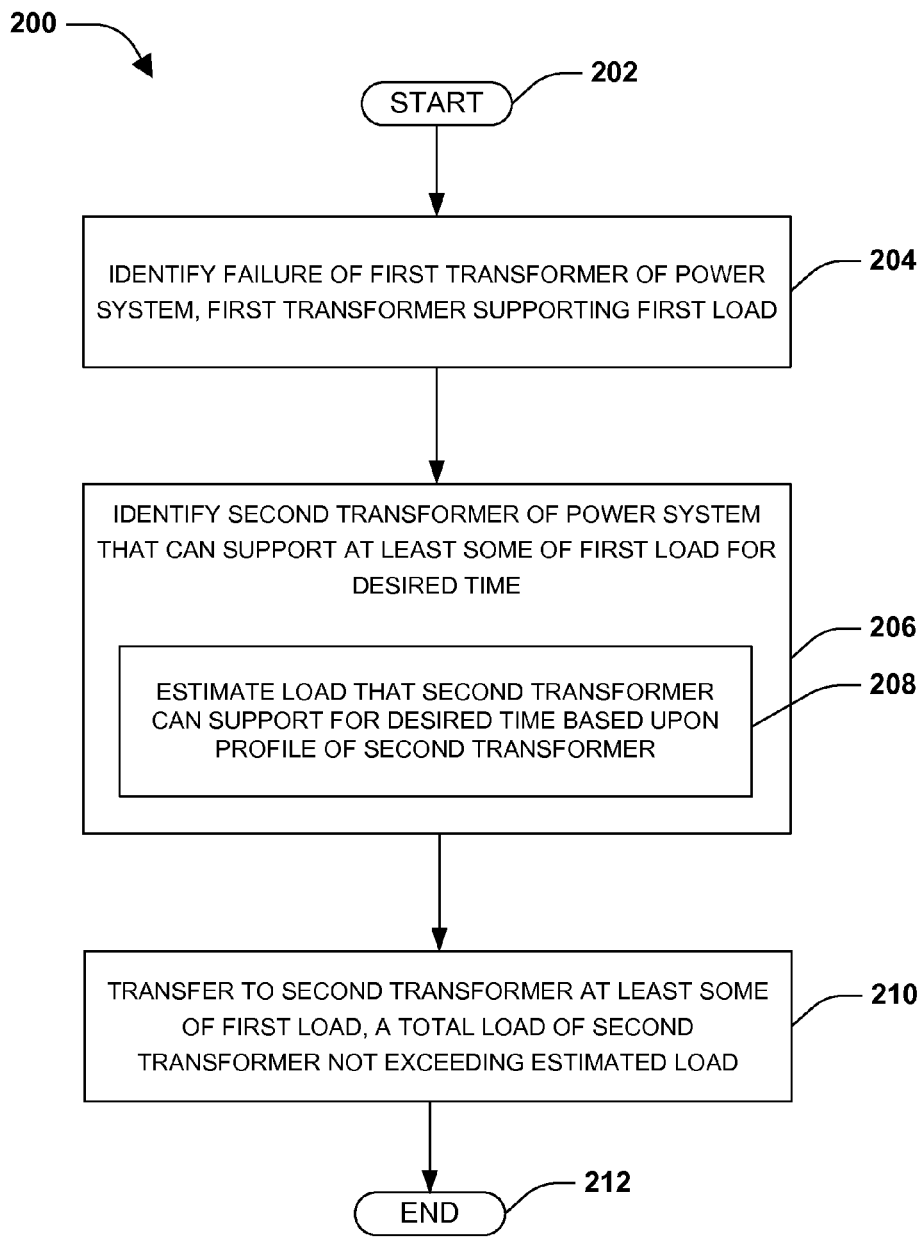
FIG. 2 is a flow diagram illustrating an exemplary method for transferring a load from a first transformer of a power system to a second transformer.

FIG. 2 illustrates another example method 200 for a power system. More particularly, the example method 200 describes how one or more transformers that are capable of supporting an added load may be identified when a transformer fails, goes offline, and/or operates below normal conditions (e.g., due to maintenance or replacement).

The example method 200 begins at 202 and a failure of a first transformer of the power system is identified at 204. The first transformer supports a first load and the failure of the first transformer may be identified automatically and/or manually. By way of example, in one embodiment, the first transformer may comprise one or more sensors configured to provide an operating status of the transformer (e.g., in real-time). When a sensor identifies that a first transformer has failed and/or is failing, an alert may be issued identifying the first transformer as having failed and/or failing. In another embodiment, the identification may take a more manual approach. For example, a call-center may receive calls from the general public. If a call-center receives calls indicating that the power is out and/or indicating that an explosion or other event occurred at a transformer, a power utility company may begin to trace the problem to identify the failed first transformer. In another embodiment, such an identification may be made via video monitoring equipment, such as frequently comprised at one or more substations, for example. It may be appreciated that the foregoing techniques are merely provided as example techniques and that other identification techniques are also contemplated Moreover, it may be appreciated that a failure may be a planned or intentional failure and/or may be unintentional. By way of example, planned or intentional failures may be caused during routine maintenance and/or replacement, where the first transformer is partially and/or completely de-energized to facilitate performing some action with respect to the transformer (e.g., such as replacing a component of the transformer, performing a test on the transformer, etc.). An example of an unintentional failure may be a power surge and/or equipment malfunction that unexpectedly reduces (e.g., to zero) power output, for example. As used herein, failure may refer to both unplanned and planned situations where the load of the first transformer is reduced and/or where the transformer is at least partially de-energized, for example.

At 206 in the example method 200, a second transformer of the power system is identified that can support at least some of the first load (e.g., initially supported by the first transformer) for a desired time. That is, stated differently, a second transformer to which at least a portion of the first load may be transferred while the first transformer is operating with a reduced load (or no load) may be identified. By way of example, it may be expected that the first transformer will be de-energized for approximately 1 hour. Thus, at 206 in the example method 200, a transformer that can support at least a portion of the first load for at least 1 hour may be identified (e.g., to support the load until the first transformer can be fully functional again). In this way, at least one transformer is identified that has excess capacity to support an additional load for a desired time.

As part of identifying the second transformer at 206, a load that the second transformer can support for the desired time is estimated based upon a profile of the second transformer at 208. By way of example, a desired time (e.g., or length of time), such as 1 hour, may be input into a system, and the system may utilize the profile of the second transformer (e.g., and present operating conditions of the second transformer) to estimate a load that the second transformer can support for a 1 hour time span. A difference between the present load of the second transformer and the estimated load (e.g., a maximum load) may correspond to an additional load that the second transformer can support.

It may be appreciated that the example method 100 of FIG. 1 describes an example technique for developing a profile of a transformer and/or for predicting a load that a transformer can support. Thus, for purposes of brevity, such techniques are not further described for the creation of the profile of the second transformer. Rather, it may suffice to note that the profile describes how the second transformer is expected to perform at various operating conditions and that such a profile may be developed via a machine learning algorithm (e.g., such as a neural network algorithm) that utilizes historical data corresponding to the second transformer as an input.

At 210 in the example method 200, at least some of the first load is transferred to the second transformer when it is determined that the second transformer has excess capacity (e.g., that the second transformer can support an additional load apart from the load presently being supported by the second transformer). It may be appreciated that the total load of the second transformer is typically not to exceed the load estimated at 208 (e.g., to mitigate a possibility that the second transformer will fail and/or that the oil temperature of the second transformer will exceed a specified threshold).

It may be appreciated that where the second transformer is unable to support the entire first load for the desired length of time, acts 206-210 may be repeated for additional transformers to distribute the load across a plurality of transformers, for example.

At 212, the example method 200 ends.

Figure 3:
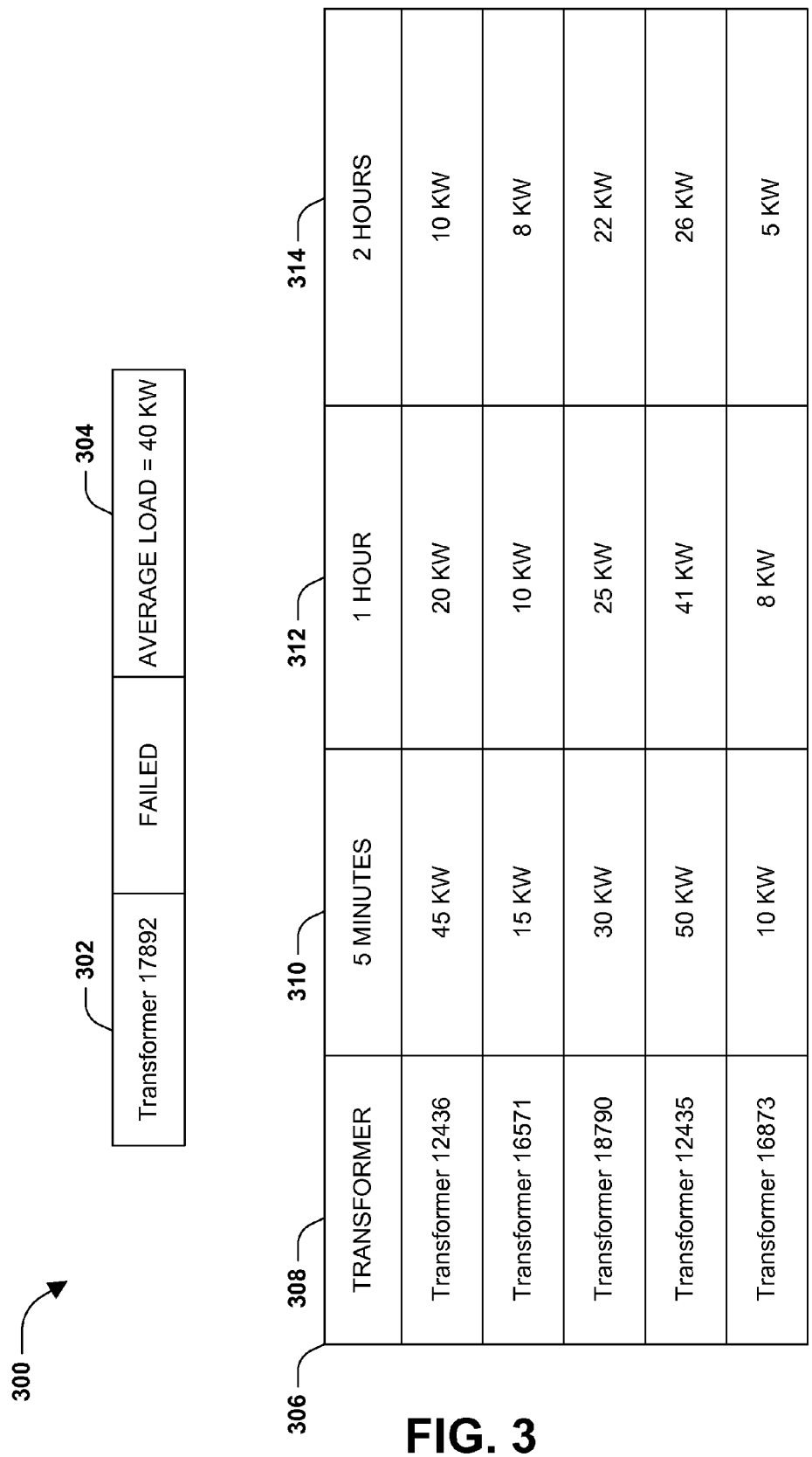
FIG. 3 illustrates an example environment for identifying one or more transformers to which a load of a failed transformer may be transferred.

Referring to FIG. 3, an example environment 300 is provided for identifying one or more transformers with excess capacity and/or for determining where to transfer a load of a failed transformer.

In the illustrated embodiment, transformer 17892 302 has failed. The average load 304 for failed transformer is 40 kW. Thus, it may be desirable to transfer 40 kW to one or more other transformers while transformer 17892 is undergoing maintenance and/or repair, for example. In this way, performance of the power system may be substantially maintained while transformer 17892 is operating at a reduced capacity (or no capacity), for example.

The example environment 300 comprises a chart 306 which may be utilized to determine how to transfer the load of transformer 17892 to one or more other transformers. More particularly, the chart 306 comprises a first column 308 listing a plurality of transformers with excess capacity. A second column 310 describes how much additional load can be supported by respective transformers for a 5 minute interval. A third column 312 describes how much additional load can be supported by respective transformers for an hour interval, and a fourth column 314 describes how much additional load can be supported by respective transformers for a two hour interval. The identification of transformers with excess capacity and/or the values comprised in the second through fourth columns 310-314 may be derived using at least some of the example method 100 and/or the example method 200 described with respect to FIG. 1 and FIG. 2, respectively, for example.

The transformers listed in the chart 306 may be arranged (e.g., ranked) using any number of schemes. For example, the transformers may be arranged according to their respective proximity to the failed transformer and/or according to the ease with which a load may be transferred from the failed transformer to respective transformers. In another embodiment, the transformers may be arranged as a function of their respective excess capacity for one or more of the time intervals, for example.

As illustrated, the amount of additional load that can be supported by respective transformers may be a function of time. By way of example, if the load of the failed transformer is to be supported by other transformers for merely 5 minutes, it may be desired to transfer the entire load to transformer 12436 because transformer 12436 can support an additional 45 kW for 5 minutes. If it is expected that the failed transformer will be inoperable for 2 hours, a single transformer may be unable to support the entire 40 kW load for the 2 hour period. Thus, it may be desirable to distribute the load across a plurality of transformers. For example, the load may be distributed across transformers 12436, 16571, and 18790. In another embodiment, it may be desired to distribute the load across the fewest number of transformers possible, and thus the load may be distributed across merely transformer 18790 and 12435, for example.

Thus, the chart 306 provides a tool with which a system and/or a technician may determine how a load of a failed transformer can be distributed across one or more other transformers without increasing the oil temperature of respective transformers to which the load is distributed above a specified threshold and/or without increasing the load of a transformer(s) to which the load is distribute beyond a level that the transformer can support, for example.

Figure 4:
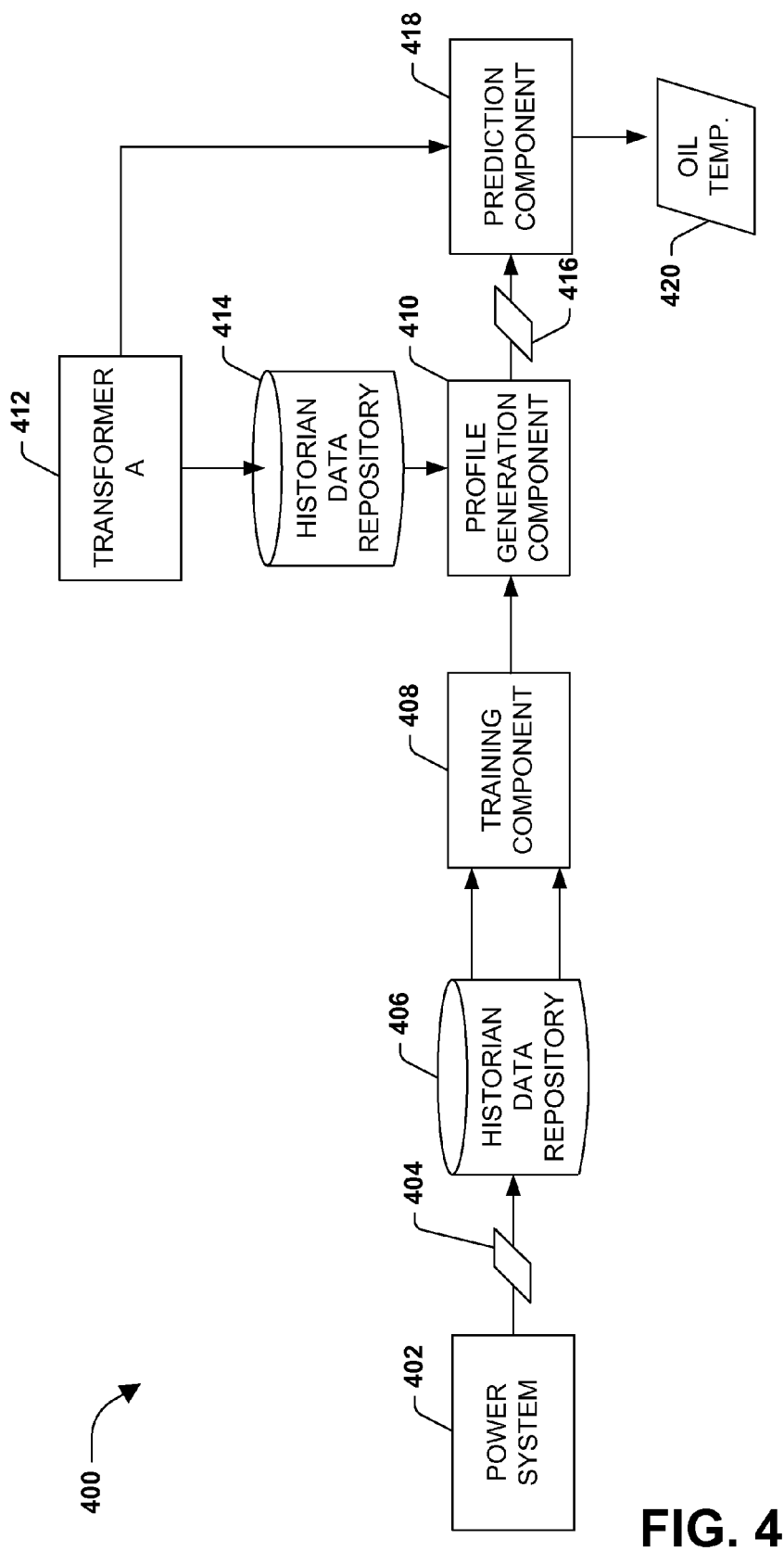
FIG. 4 illustrates a component block diagram of an example system for a power system.
Figure 5:
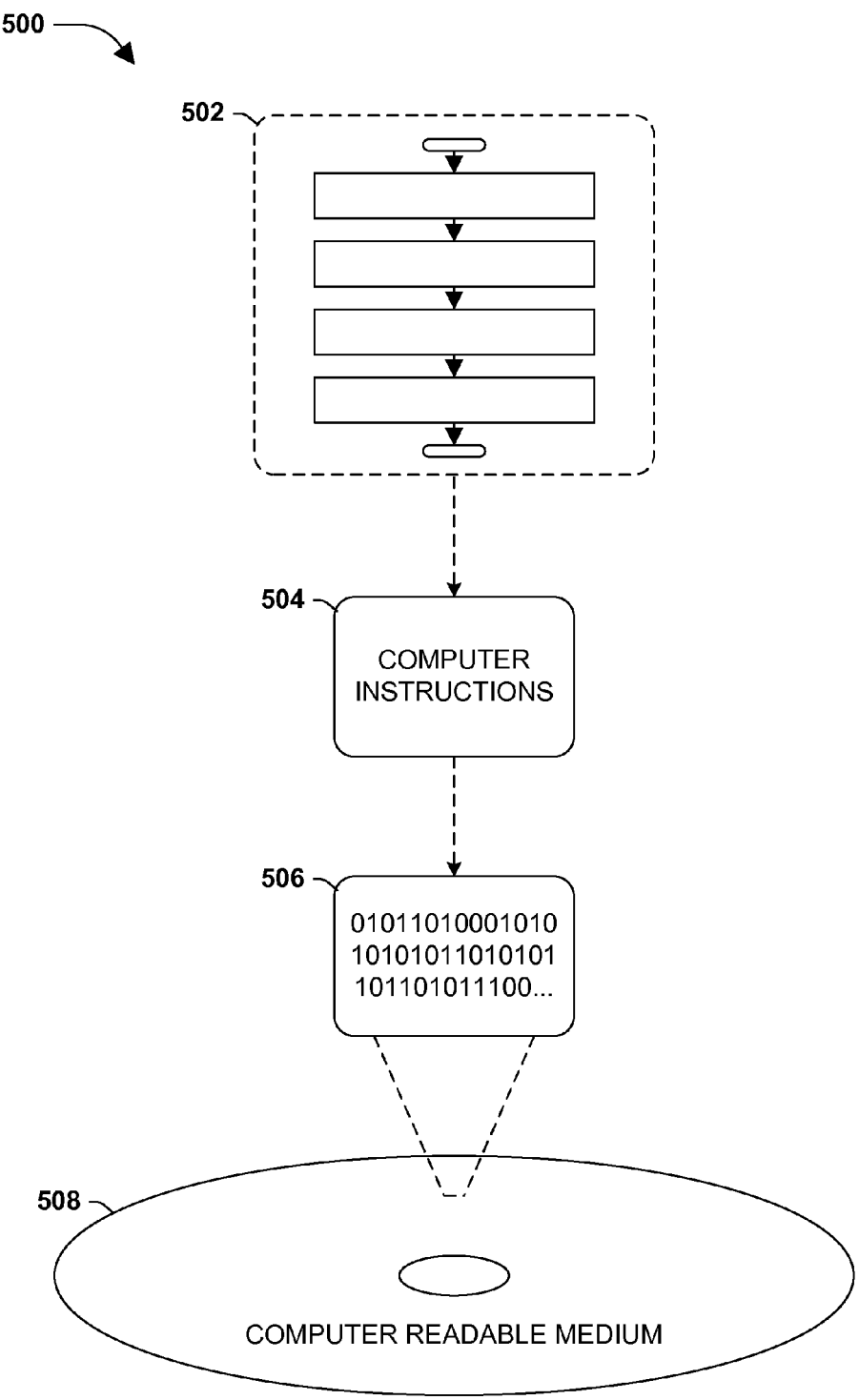
FIG. 5 is an illustration of an exemplary computer-readable medium wherein processor-executable instructions configured to embody one or more of the provisions set forth herein may be comprised.

Referring to FIG. 4, an example environment 400 of a system for use with a power system 402 is provided. Such a system may be utilized for transferring loads between one or more transformers of the power system 402 and/or for determining the capacity of a transformer (e.g., such as transformer A 412) given present operating conditions, for example.

In the example environment 400, historical data 404 may be collected or derived from components of the power system 402, such as from at least some transformers of the power system 402. Typically, the historical data corresponds to more than one electric component, such as more than one transformer. For example, the historical data 404 may pertain to all of the transformers of the power system 402 and/or a subset of transformers, such as a particular class of transformers which are of particular interest. As previously described, the historical data 404 may comprise historical sensor data, historical field test data, and/or heat run test data, for example, at least some of which is representative of measurements taken over time. In this way, the historical data 404 may be indicative of properties of the power system and/or components thereof (e.g., such as oil temperature) under various operating conditions (e.g., such as under various loads and/or ambient air temperatures).

In the illustrated embodiment, the historical data 404 may be stored in a historian data repository 406 (e.g., such as a central repository and/or any other type of storage mechanism that may store historical data, real-time data, predicted data, and/or any other type of data, etc.). It may be appreciated that the historian data repository 406 may comprise one or more storage devices, and thus some of the historical data may be stored in a different physical location than other historical data, for example.

The example environment 400 further comprises a training component 408 operably coupled to the historian data repository 406. The training component is configured to receive at least some of the historical data 404 from the historian data repository 406 and is configured to utilize the received historical data to train a machine-learning algorithm. That is, stated differently, the training component 408 is configured to receive, as an input, at least some of the historical data 404 comprised in the historian data repository 406 and to develop an algorithm based upon the input that attempts to identify patterns or trends in the historical data 404. In this way, when provided with data corresponding to a particular transformer, for example, a profile may be developed indicative of how the transformer is expected to respond in various situations.

The machine learning algorithm that is designed and/or developed using the historical data 404 from the power system 402 may be any one of numerous types of machine-learning algorithms. For example, in one embodiment, the machine learning algorithm is a neural network algorithm, such as a feed-forward artificial neural network algorithm comprising one or more hidden layers. In other embodiments, the machine-learning algorithm may utilize a decision tree learning approach, an association rule learning approach, or other approaches to develop or train the algorithm instead of or in conjunction with an artificial neural network approach.

The example environment 400 further comprises a profile generation component 410 operably coupled to the training component 408 and configured to receive the trained machine-learning algorithm from the training component 408. Utilizing the machine-learning algorithm, as well as historical information corresponding to a transformer of interest, for example, such as transformer A 412, the profile generation component 410 may be configured to develop a profile 416 of the transformer. By way of example, where the machine learning algorithm is a neural network algorithm, the profile generation component 410 may be configured to develop a profile 416 of transformer A 412 using the neural network algorithm (e.g., where the neural network algorithm receives, as an input, historical data corresponding to transformer A 412).

In the example environment, the historical data corresponding to transformer A 412 may be received by the profile generation component 410 from a second historian data repository 414. The second historian data repository 414 may be the same historian data repository as the historian data repository 406 configured to store the historical data 404 of the power system 402 or may be a different historian data repository. Moreover, the historical data corresponding to transformer A 412 may comprise historical sensor data, historical field test data, and/or heat run test data, for example, indicative of measurements acquired from transformer A 412 and/or acquired from test performed to/on transformer A 412, for example.

The profile 416 that is generated by the profile generation component 410 may describe how the transformer is expected to perform under various operating conditions and may be provided to a prediction component 418 of the example environment 418. The prediction component 418 may be configured to predict an oil temperature 420 of the transformer at a desired load based upon the profile 416 of the transformer. That is, stated differently, the prediction component 418 may be configured to receive, as an input, a load that is desired to be applied to transformer A 412, and may be configured to predict an oil temperature 420 of transformer A 412 for the desired load. As previously described, in this way, the prediction component 418 may predict whether transformer A 412 can support the load and/or whether transformer A 412 can support the desired load for a desired time (e.g., length of time).

In one embodiment, to more accurately predict the oil temperature 420 of transformer A 412 for a desired load, the prediction component 418 may be operably coupled to transformer A 412 and may be configured to receive information/data indicative of presenting operating conditions of the transformer (e.g., such as a present oil temperature, present ambient air temperature, present core temperature, etc.). In this way, present operating conditions may be taken into consideration when predicting an oil temperature 420 of transformer A 412 for a desired load, for example. That is, stated differently, the prediction component 418 may be configured to predict the oil temperature 420 of the transformer at the desired load based upon present operating conditions of the transformer.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 500 comprises a computer-readable medium 508 (e.g., a CD-R, DVD-R, or a platter of a hard disk drive), on which is encoded computer-readable data 506. This computer-readable data 506 in turn comprises a set of computer instructions 504 configured to operate according to one or more of the principles set forth herein. In one such embodiment 500, the processor-executable computer instructions 504 may be configured to perform a method 502 such as at least some of the exemplary method 100 of FIG. 1 and/or at least some of the exemplary method 200 of FIG. 2, for example. In another such embodiment, the processor-executable instructions 504 may be configured to implement a system, such as at least some of the exemplary system 400 of FIG. 4, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 6:
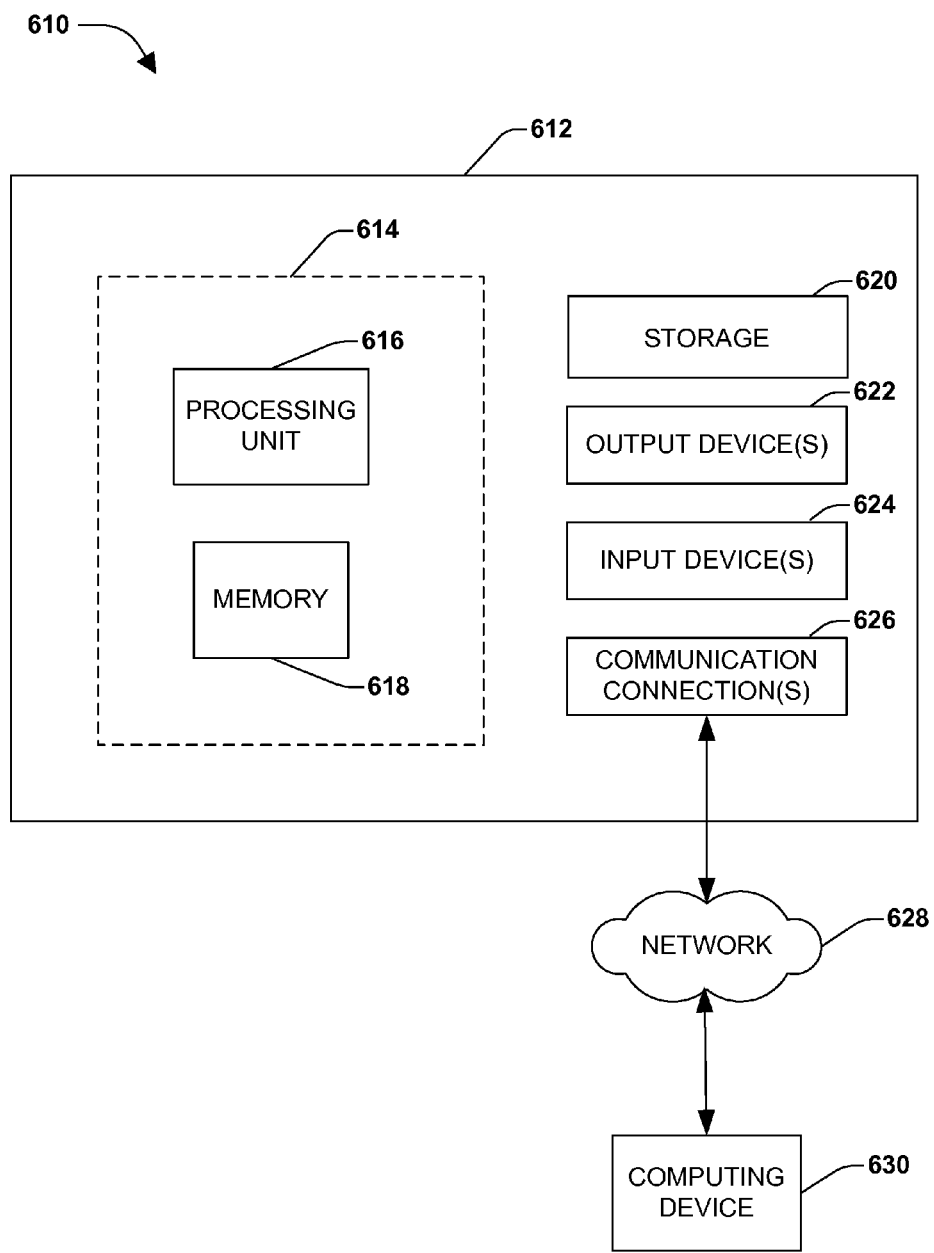
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 610 comprising a computing device 612 configured to implement one or more embodiments provided herein. In one configuration, computing device 612 includes at least one processing unit 616 and memory 618. Depending on the exact configuration and type of computing device, memory 618 may be volatile (such as RAM, for example), non-volatile (such as ROM, flash memory, etc., for example) or some combination of the two. This configuration is illustrated in FIG. 6 by dashed line 614.

In other embodiments, device 612 may include additional features and/or functionality. For example, device 612 may also include additional storage (e.g., removable and/or non-removable) including, but not limited to, magnetic storage, optical storage, and the like. Such additional storage is illustrated in FIG. 6 by storage 620. In one embodiment, computer readable instructions to implement one or more embodiments provided herein may be in storage 620. Storage 620 may also store other computer readable instructions to implement an operating system, an application program, and the like. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 612. Any such computer storage media may be part of device 612.

Device 612 may also include communication connection(s) 626 that allows device 612 to communicate with other devices. Communication connection(s) 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection(s) 626 may include a wired connection or a wireless connection. Communication connection(s) 626 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 612 may include input device(s) 624 such as keyboard, mouse, pen, voice input device, touch input device, infrared cameras, video input devices, and/or any other input device. Output device(s) 622 such as one or more displays, speakers, printers, and/or any other output device may also be included in device 612. Input device(s) 624 and output device(s) 622 may be connected to device 612 via a wired connection, wireless connection, or any combination thereof. In one embodiment, an input device or an output device from another computing device may be used as input device(s) 624 or output device(s) 622 for computing device 612.

Components of computing device 612 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 612 may be interconnected by a network. For example, memory 618 may be comprised of multiple physical memory units located in different physical locations interconnected by a network.

Those skilled in the art will realize that storage devices utilized to store computer readable instructions may be distributed across a network. For example, a computing device 630 accessible via a network 628 may store computer readable instructions to implement one or more embodiments provided herein. Computing device 612 may access computing device 630 and download a part or all of the computer readable instructions for execution. Alternatively, computing device 612 may download pieces of the computer readable instructions, as needed, or some instructions may be executed at computing device 612 and some at computing device 630.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an"

as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for a power system, comprising:
   predicting an oil temperature of a transformer of the power system for a desired load based upon a profile of the transformer developed via a machine-learning algorithm; and
   predicting a length of time that the transformer can support the desired load as a function of the predicted oil temperature.

2. The method of claim 1, comprising:
   acquiring heat run test data for the transformer, wherein the predicting an oil temperature comprises:
      predicting the oil temperature by applying the heat run test data to the machine-learning algorithm.

3. The method of claim 1, comprising:
   responsive to the predicted oil temperature indicating that the transformer cannot support the desired load for a desired length of time, identifying a load that can be supported by the transformer for the desired length of time.

4. The method of claim 1, comprising:
   providing the machine-learning algorithm with historical data corresponding to the transformer to develop the profile of the transformer.

5. The method of claim 1, comprising:
   training the machine-learning algorithm utilizing historical data from the power system.

6. The method of claim 1, wherein the machine-learning algorithm is a feed-forward artificial neural network algorithm.

7. The method of claim 6, wherein the feed-forward artificial neural network algorithm comprises two hidden layers.

8. The method of claim 4, wherein the historical data corresponding to the transformer is derived from at least one of:
   one or more sensors operably coupled to the transformer; or
   a heat run test performed on the transformer.

9. The method of claim 1, wherein the predicting an oil temperature comprises:
   predicting the oil temperature of the transformer for the desired load based upon present operating conditions of the transformer, the present operating conditions comprising at least one of:
      a present load of the transformer;
      a present ambient air temperature proximate the transformer; or
      a present oil temperature of the transformer.

10. The method of claim 1, wherein the profile describes how the transformer is expected to perform at various operating conditions.

11. A method for a power system, comprising:
    identifying a failure of a first transformer of the power system, the first transformer supporting a first load;
    identifying a second transformer of the power system that can support at least some of the first load for a desired length of time, comprising:
       estimating a load that the second transformer can support for the desired length of time based upon a profile of the second transformer; and
    transferring, to the second transformer, at least some of the first load, a total load of the second transformer not exceeding the estimated load.

12. The method of claim 11, wherein the profile of the second transformer is developed via a machine learning algorithm.

13. The method of claim 12, wherein at least one of:
    the profile describes how the second transformer is expected to perform at various operating conditions; or
    historical data corresponding to the second transformer is utilized as an input to the machine learning algorithm.

14. The method of claim 13, wherein the historical data is derived from at least one of:
    one or more sensors operably coupled to the second transformer; or
    a heat run test performed on the second transformer.

15. The method of claim 12, comprising:
    training the machine-learning algorithm utilizing historical data from the power system.

16. The method of claim 11, wherein the profile of the second transformer is developed via a feed-forward neural network algorithm.

17. The method of claim 11, wherein the estimating is based upon present operating conditions of the second transformer, the present operating conditions comprising at least one of:
    a present load of the second transformer;
    a present ambient air temperature proximate the second transformer; or
    a present oil temperature of the second transformer.

18. A system for a power system, comprising:
    a profile generation component configured to develop a profile of a transformer of the power system using a neural network algorithm, the neural network algorithm receiving, as an input, historical data corresponding to the transformer; and
    a prediction component configured to predict an oil temperature of the transformer at a desired load based upon the profile of the transformer and predict a length of time that the transformer can support the desired load as a function of the predicted oil temperature.

19. The system of claim 18, wherein the prediction component is configured to predict the oil temperature of the transformer at the desired load based upon present operating conditions of the transformer.

20. The system of claim 18, comprising a training component configured to train the neural network algorithm based upon historical data from the power system.

* * * * *